US009454453B2

(12) United States Patent
Masuda (10) Patent No.: US 9,454,453 B2
(45) Date of Patent: Sep. 27, 2016

(54) REPORT PRODUCTION APPARATUS, REPORT PRODUCTION SYSTEM, AND REPORT PRODUCTION METHOD

(75) Inventor: Yusaku Masuda, Kanagawa (JP)

(73) Assignee: RICOH COMPANY, LTD., Tokyo (JP)

(*) Notice: Subject to any disclaimer, the term of this patent is extended or adjusted under 35 U.S.C. 154(b) by 664 days.

(21) Appl. No.: 13/408,484

(22) Filed: Feb. 29, 2012

(65) Prior Publication Data

US 2012/0233320 A1 Sep. 13, 2012

(30) Foreign Application Priority Data

Mar. 7, 2011 (JP) ................................. 2011-049486

(51) Int. Cl.
*G06F 15/173* (2006.01)
*G06F 11/32* (2006.01)
*G06F 11/07* (2006.01)

(52) U.S. Cl.
CPC ........... *G06F 11/32* (2013.01); *G06F 11/0733* (2013.01); *G06F 11/0748* (2013.01); *G06F 11/0775* (2013.01); *G06F 11/0784* (2013.01)

(58) Field of Classification Search
CPC .......... H04L 41/5003; H04L 41/5009; H04L 41/5032; G06F 11/32; G06F 11/0733; G06F 11/0775
See application file for complete search history.

(56) References Cited

U.S. PATENT DOCUMENTS 7,467,192 B1* 12/2008 Lemler et al. ................ 709/223
7,558,847 B2* 7/2009 Strassner ...................... 709/223
2002/0120624 A1* 8/2002 Givoly et al. ..................... 707/7
2006/0179412 A1* 8/2006 Clymer et al. ................ 715/764
2007/0067175 A1* 3/2007 Fulgham et al. ................. 705/1
2007/0168874 A1* 7/2007 Kloeffer ................ G06Q 10/06 715/764
2010/0114531 A1* 5/2010 Korn et al. ................... 702/186
2010/0321709 A1* 12/2010 Eastman ....................... 358/1.9
2011/0167057 A1* 7/2011 Lamm .......................... 707/722

FOREIGN PATENT DOCUMENTS

JP 2001-320370 11/2001
JP 2002-132993 5/2002

(Continued)

OTHER PUBLICATIONS

Office Action issued on Jul. 29, 2014 in the corresponding Japanese Patent Application No. 2011-049486.

*Primary Examiner* — Esther B Henderson
(74) *Attorney, Agent, or Firm* — Oblon, McClelland, Maier & Neustadt, L.L.P.

(57) ABSTRACT

A report production apparatus includes a first collection unit configured to make requests depending on multiple types of device management systems respectively to collect pieces of device management information and convert the collected pieces into a common format, each piece of device management information being about usage of devices disposed at a base of the device management system; a second collection unit configured to make a request to collect contract information about quality assurance for the devices from a contract system; a third collection unit configure to make requests depending on multiple types of service desk systems respectively to collect pieces of service information and convert the collected pieces into another common format, each piece of service information being about device abnormality of the devices disposed at the base of the service desk system; and a production unit configured to produce a report using the above information.

14 Claims, 9 Drawing Sheets

(56) References Cited

FOREIGN PATENT DOCUMENTS

| | | |
|---|---|---|
| JP | 2002-269293 | 9/2002 |
| JP | 2003-123000 | 4/2003 |
| JP | 2007-18246 | 1/2007 |
| JP | 2007-316265 | 12/2007 |
| JP | 2008-147874 | 6/2008 |
| WO | WO 2010/073316 A1 | 7/2010 |

* cited by examiner

| Device Property | | | SLA | Incident | | | | | Meter value | | | |
|---|---|---|---|---|---|---|---|---|---|---|---|---|
| Manufacture | Model | Serial Number | Contract | Total Incident | Jam | Toner | other | 2010/4 | 2010/5 | 2010/6 | 2010/7 |
| Vendor A | xx | yy | Available | 560 | 256 | 4 | 300 | 256 | 468 | 468 | 468 |
| Vendor A | xx | yy | Available | 60 | 0 | 50 | 10 | 305 | 468 | 568 | 22 |
| Vendor A | xx | yy | Available | 70 | 30 | 30 | 10 | 22 | 468 | 468 | 468 |
| Vendor A | xx | yy | Available | 22 | 5 | 10 | 7 | 22 | 3578 | 256 | 256 |
| Vendor A | xx | yy | No | 512 | 468 | 22 | 22 | 0 | 468 | 22 | 22 |
| Vendor B | xx | yy | No | 746 | 468 | 22 | 256 | 0 | 468 | 22 | 256 |
| Vendor B | xx | yy | Available | 980 | 468 | 256 | 256 | 2 | 468 | 256 | 256 |
| Vendor B | xx | yy | Available | 456 | 0 | 456 | 0 | 456 | 468 | 22 | 22 |

FIG.7

| Device Property | | | Meter value | | | |
|---|---|---|---|---|---|---|
| Manufacture | Model | Serial | 2010/4 | 2010/5 | 2010/6 | 2010/7 |
| Vendor A | xx | yy | 256 | 468 | 468 | 468 |
| Vendor A | xx | yy | 305 | 468 | 568 | 22 |
| Vendor A | xx | yy | 22 | 468 | 468 | 468 |
| Vendor A | xx | yy | 22 | 3578 | 256 | 256 |
| Vendor A | xx | yy | 0 | 468 | 22 | 22 |
| Vendor B | xx | yy | 0 | 468 | 22 | 256 |
| Vendor B | xx | yy | 2 | 468 | 256 | 256 |
| Vendor B | xx | yy | 456 | 468 | 22 | 22 |

FIG.8

| Group (Serial) | SLA | Incident | | | |
|---|---|---|---|---|---|
| Name | Contract | Total Incident | Jam | Toner | other |
| Site A (yy) | Available | 560 | 256 | 4 | 300 |
| Site A (yy) | Available | 60 | 0 | 50 | 10 |
| Site A (yy) | Available | 70 | 30 | 30 | 10 |
| Site A (yy) | Available | 22 | 5 | 10 | 7 |
| Site A (yy) | No | 512 | 468 | 22 | 22 |
| Site B (yy) | No | 746 | 468 | 22 | 256 |
| Site B (yy) | Available | 980 | 468 | 256 | 256 |
| Site B (yy) | Available | 456 | 0 | 456 | 0 |

FIG.10

REPORT PRODUCTION APPARATUS, REPORT PRODUCTION SYSTEM, AND REPORT PRODUCTION METHOD

CROSS-REFERENCE TO RELATED APPLICATIONS

The present application claims priority to and incorporates by reference the entire contents of Japanese Patent Application No. 2011-049486 filed in Japan on Mar. 7, 2011.

BACKGROUND OF THE INVENTION

1. Field of the Invention

The present invention relates to a report production apparatus, a report production system, and a report production method.

2. Description of the Related Art

Conventionally, in the filed of MPS (managed printing service), an assurance item such as an SLA (service level agreement) contract including, for example, an upper limit of the count of device troubles in a period of time, has been generally exchanged as quality assurance for device maintenance service for customers.

In order to realize the assurance item, device management systems for managing device management information such as a usage of devices or service desk systems for managing service information such as device abnormality have been introduced.

Here, a technique for producing and presenting service reports for network devices is disclosed, for example, in Japanese Patent Application Laid-open No. 2001-320370. Specifically, a technique for producing a service report based on service level contract information about service quality associated with a customer of service, alarm information collected from a network device, and service configuration information that is combined information of the network device and the service, and presenting the produced service report to, for example, customers via a network is disclosed.

However, in the related art as described above, when contract target devices are disposed over a plurality of bases, device management systems or service desk systems of types different between the bases are often occurred. Thereby, aspects of device management information or service information managed at the respective bases differ from one another and it is difficult to produce reports.

Therefore, there is a need for a report production apparatus, a report production system, and a report production method capable of producing a report for devices disposed over a plurality of bases.

SUMMARY OF THE INVENTION

It is an object of the present invention to at least partially solve the problems in the conventional technology.

According to an embodiment, there is provided a report production apparatus that includes a first collection unit configured to make acquisition requests depending on multiple types of device management systems respectively to collect pieces of device management information from the respective device management systems and convert the collected pieces of device management information into a common format for device management information, each piece of device management information being about usage of devices disposed at a base of the device management system for managing the each piece of device management information; a second collection unit configured to make an acquisition request to collect contract information about quality assurance for the devices from a contract system for managing the contract information; a third collection unit configure to make acquisition requests depending on multiple types of service desk systems respectively to collect pieces of service information from the respective service desk systems and convert the collected pieces of service information into a common format for service information, each piece of service information being about device abnormality of the devices disposed at the base of the service desk system for managing the each piece of service information; and a production unit configured to produce a report using the device management information with the common format for device management information, the contract information, and the service information with the common format for service information and output the report.

According to another embodiment, there is provided a report production system that includes multiple types of device management systems each configured to manage a piece of device management information about usage of devices disposed at a base of each device management system; a contract system configured to manage contract information about quality assurance for each device; multiple types of service desk systems each configured to manage a piece of service information about device abnormality of the devices disposed at the base of each service desk system; and a report production apparatus that includes a first collection unit configured to make acquisition requests depending on the multiple types of device management systems respectively to collect pieces of device management information from the respective device management systems and convert the collected pieces of device management information into a common format for device management information, a second collection unit configured to make an acquisition request to collect contract information about quality assurance for the devices from the contract system, a third collection unit configure to make acquisition requests depending on the multiple types of service desk systems respectively to collect pieces of service information from the respective service desk systems and convert the collected pieces of service information into a common format for service information, and a production unit configured to produce a report using the device management information with the common format for device management information, the contract information, and the service information with the common format for service information and output the report.

According to still another embodiment, there is provided a report production method that includes making, by a first collection unit, acquisition requests depending on multiple types of device management systems respectively to collect pieces of device management information from the respective device management systems and convert the collected pieces of device management information into a common format for device management information, each piece of device management information being about usage of devices disposed at a base of the device management system for managing the each piece of device management information; making, by a second collection unit, an acquisition request to collect contract information about quality assurance for the devices from a contract system for managing the contract information; making, by a third collection unit, acquisition requests depending on multiple types of service desk systems respectively to collect pieces of service information from the respective service desk systems and convert the collected pieces of service information into a common format for service information, each piece of service information being about device abnormality of the devices disposed at the base of the service desk system for managing the each piece of service information; and producing, by a production unit, a report using the device management information with the common format for device management information, the contract information, and the service information with the common format for service information to output the report.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Hereinafter, a report production apparatus, a report production system, a report production method, a report production program and a recording medium according to embodiments of the present invention will be described in detail with reference to the accompanying drawings.

First, a configuration of a report production system of the present embodiment will be described.

Figure 1:
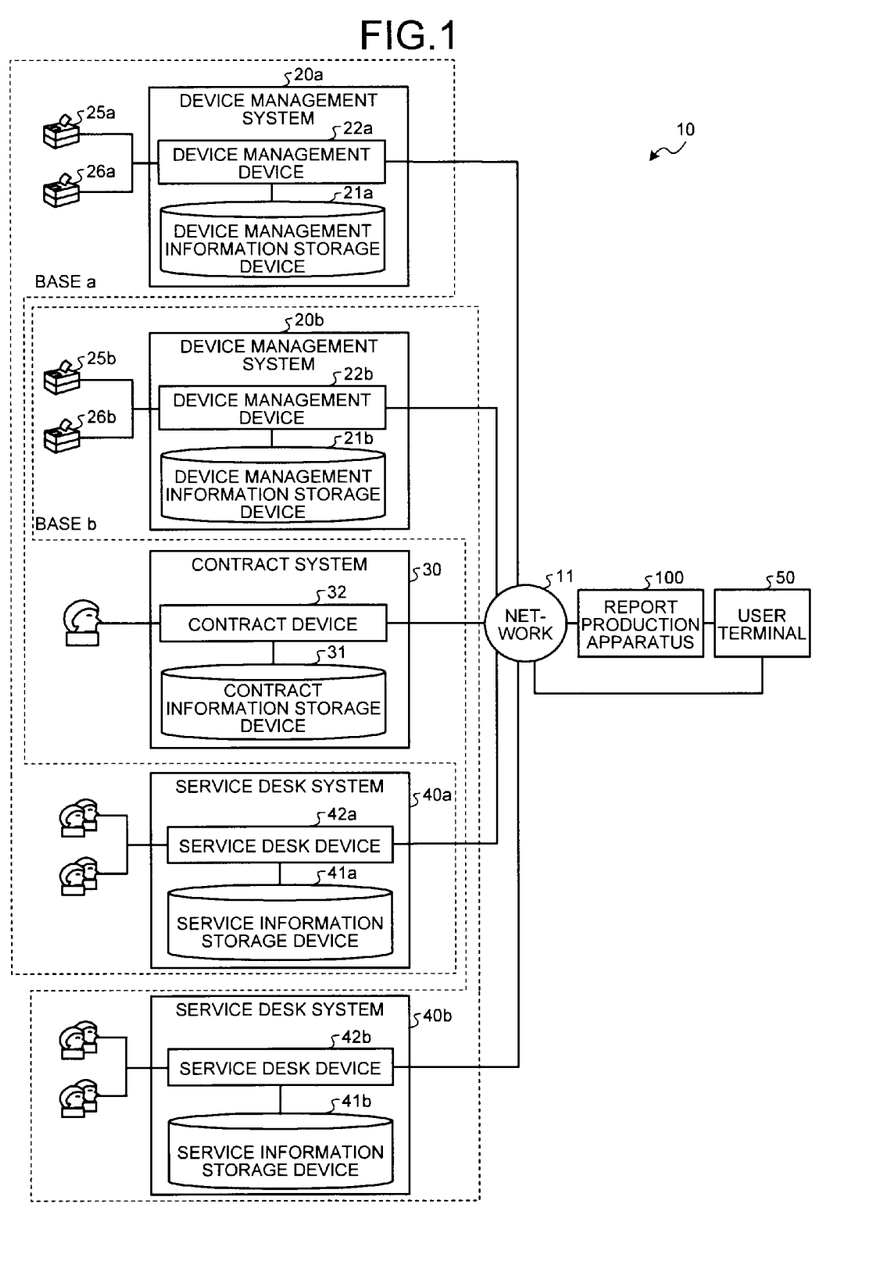
FIG. 1 is a block diagram showing an example of a configuration of a report production system of the present embodiment.

FIG. 1 is a block diagram showing an example of a configuration of a report production system 10 of the present embodiment. As shown in FIG. 1, the report production system 10 includes device management systems 20a and 20b, a contract system 30, service desk systems 40a and 40b, and a report production apparatus 100. Here, it is assumed that the device management system 20a and the service desk system 40a are disposed at a base a, and the device management system 20b and the service desk system 40b are disposed at a base b. The bases a and b are assumed to be bases of the same customer. The bases a and b may exist in the same or different countries. Further, in the example shown in FIG. 1, a case in which there are two device management systems and two service desk systems is described by way of example, but the present invention is not limited thereto. The numbers of the device management systems and the service desk systems may be plural.

The device management systems 20a and 20b, the contract system 30, the service desk systems 40a and 40b, and the report production apparatus 100 are connected via a network 11. Further, the report production apparatus 100 is also connected with a user terminal 50 via the network 11. The network 11 may be realized, for example, as a public communication line or a specific communication line (dedicated line).

The device management system 20a is a database system for managing device management information about a usage of an image forming device, such as a printing device, a copying machine, an MFP, or a facsimile device, disposed at the base a. Here, the MFP is a device having at least two of a copying function, a printing function, a scanner function, and a facsimile function. In the example shown in FIG. 1, only printing devices 25a and 26a are illustrated as image forming devices disposed at the base a, but image forming devices that are management targets of the device management system 20a are not limited thereto. Further, in the present embodiment, an example in which the device management systems 20a and 20b manage the image forming devices will be described, but the management target device is not limited thereto and, for example, the management target device may be any device capable of acquiring device management information, for example, any information processing device such as a personal computer (PC), a projector, or a camera.

In the present embodiment, an example in which the device management information includes a device ID for identifying the image forming device and an output (printing) count of the image forming device will be described by way of example, but the present invention is not limited thereto. Further, the device ID in the device management information is a combination of a manufacturer name, a model name, and a serial number, but the present invention is not limited thereto.

The device management system 20a includes a device management information storage device 21a, and a device management device 22a.

The device management information storage device 21a is a database in which device management information acquired by the device management device 22a, which will be described later, is accumulated. In the present embodiment, the device management information storage device 21a stores device IDs and output counts of image forming devices that are management targets of the device management system 20a to be associated with each other.

The device management device 22a is a typical computer such as a server device, and regularly (e.g., monthly) acquires the device management information from the image forming devices, which are management targets of the device management system 20a, and registers the device management information in the device management information storage device 21a. In the present embodiment, the device management device 22a regularly acquires device IDs and output counts from the image forming devices, which are management targets of the device management system 20a, and registers the acquired output count in the device management information storage device 21*a* to be associated with a device ID of the device management information storage device 21*a* coincident with the acquired device ID each time the device management device 22*a* acquires the device ID and the output count.

The device management system 20*b* is a database system for managing device management information of image forming devices disposed at the base b. However, the device management system 20*b* is a database system of a different type from the device management system 20*a*, in which at least the type of a data source differs from that of the device management system 20*a*. The type of the data source may include, for example, MySQL, Oracle, or MSSQL. Further, in the example shown in FIG. 1, two printing devices 25*b* and 26*b* are illustrated as image forming devices disposed at the base b, but image forming devices that are management targets of the device management system 20*b* are not limited thereto.

The device management system 20*b* includes a device management information storage device 21*b*, and a device management device 22*b*.

The device management information storage device 21*b* is a database in which device management information acquired by the device management device 22*b*, which will be described later, is accumulated. In the present embodiment, the device management information storage device 21*b* stores device IDs and output counts of the image forming devices, which are management targets of the device management system 20*b*, to be associated with each other.

The device management device 22*b* is a typical computer such as a server device, and regularly acquires the device management information from the image forming devices, which are management targets of the device management system 20*b*, and registers the device management information in the device management information storage device 21*b*. In the present embodiment, the device management device 22*b* regularly (e.g., monthly) acquires device IDs and output counts from the image forming devices, which are management targets of the device management system 20*b*, and registers the acquired output count in the device management information storage device 21*b* to be associated with a device ID of the device management information storage device 21*b* coincident with the acquired device ID each time the device management device 22*b* acquires the device ID and the output count.

The contract system 30 is a database system for managing contract information about quality assurance for each device. In the present embodiment, it is assumed that an SLA (service level agreement) contract containing, as an assurance item, an upper limit of a device abnormality count in a given period for each of device abnormality types of respective devices disposed at the bases a and b has been exchanged between a company managing the report production system 10 and customers at the bases a and b. Thereby, in the present embodiment, a case in which the contract information is the upper limit of a device abnormality count in a given period for each of device abnormality types of respective devices disposed at the bases a and b will be described by way of example, but the present invention is not limited thereto. For example, when a time limit for serviceman arrival, a minimum rate of operation in the given period, a time limit for recovery of an abnormal device, and the like are assurance items of the SLA contract, they may be treated as contract information. Further, the contract system 30 manages contract information with other customers, as well as the contract information with the customers at the bases a and b.

The contract system 30 includes a contract information storage device 31 and a contract device 32. The contract information storage device 31 is a database in which contract information input to the contract device 32, which will be described later, is stored, and stores contract information to be associated with each customer ID for identifying a customer. The contract device 32 is a typical computer such as a server device, and receives customer IDs and contract information that, for example, a manager of the company that manages the report production system 10 inputs to the contract device 32 using an input device that is not shown. The contract device 32 registers the input contract information in the contract information storage device 31 to be associated with a customer ID of the contract information storage device 31 coincident with the input customer ID.

The service desk system 40*a* is a database system for managing service information about device abnormality of the image forming devices disposed at the base a. The image forming devices, which are the management targets of the service desk system 40*a*, are not limited to the printing devices 25*a* and 26*a*, similar to the device management system 20*a*.

In the present embodiment, a case in which the service information includes a device ID for identifying the image forming device and a device abnormality count for each device abnormality type of the image forming device will be described by way of example, but the present invention is not limited thereto. The service information is information about device abnormality and may be information corresponding to the contract information, such as a serviceman arrival time, a rate of operation, and a time limit for an abnormal device. Further, the device ID in the service information may be a serial number, but the present invention is not limited thereto.

The service desk system 40*a* includes a service information storage device 41*a* and a service desk device 42*a*.

The service information storage device 41*a* is a database in which service information based on device abnormality content input by the service desk device 42*a*, which will be described later, is accumulated. In the present embodiment, the service information storage device 41*a* stores the device ID of the image forming device, which is the management target of the service desk system 40*a*, the device abnormality count for each device abnormality type, and additionally the device abnormality content to be associated with the device ID. Further, the device abnormality content includes, for example, a device abnormality type, occurrence date and time for device abnormality, and a solution to the device abnormality.

The service desk device 42*a* is a typical computer such as a server device. The service desk device 42*a* registers, in the service information storage device 41*a*, service information based on the device abnormality content of the image forming device, which is the management target of the service desk system 40*a*, that a manager of the service desk system 40*a*, a service engineer, or the like inputs to the service desk device 42*a* using an input device that is not shown. In the present embodiment, the service desk device 42*a* receives the device ID and the device abnormality content of the image forming device, which is the management target of the service desk system 40*a*. The service desk device 42*a* updates the device abnormality count for each device abnormality type related to the input device abnormality content, which is associated with a device ID of the service information storage device 41a coincident with the input device ID, and registers the input device abnormality content in the service information storage device 41a to be associated with the device ID.

The service desk system 40b is a database system for managing service information of the image forming devices disposed at the base b. However, the service desk system 40b is a database system of a different type from the service desk system 40a, in which at least a type of a data source differs from that of the service desk system 40a. Further, the image forming devices that are the management target of the service desk system 40b are not limited to the printing devices 25b and 26b, similar to the device management system 20b.

The service desk system 40b includes a service information storage device 41b, and a service desk device 42b.

The service information storage device 41b is a database in which service information based on the device abnormality content input by the service desk device 42b, which will be described later, is stored. In the present embodiment, the service information storage device 41b stores the device IDs of the image forming devices, which are the management target of the service desk system 40b, the device abnormality count for each device abnormality type, and additionally the device abnormality content to be associated with the device ID.

The service desk device 42b is a typical computer such as a server device. The service desk device 42b registers, in the service information storage device 41b, service information based on the device abnormality content of the image forming device, which is the management target of the service desk system 40b, that a manager of the service desk system 40b, a service engineer, or the like inputs to the service desk device 42b using an input device that is not shown. In the present embodiment, the service desk device 42b receives the device ID and the device abnormality content of the image forming device that is the management target of the service desk system 40b. The service desk device 42b updates the device abnormality count of a device abnormality type related to the input device abnormality content, which is associated with a device ID of the service information storage device 41b coincident with the input device ID, and registers the input device abnormality content in the service information storage device 41b to be associated with the device ID.

Thus, in the service desk systems 40a and 40b, the registration of the service information is based on manual registration. Accordingly, the device ID consists of only a serial number from the viewpoint of simplification of registration (input). On the other hand, in the device management systems 20a and 20b, the registration of device management information is automated. Accordingly, the registration simplification is not really necessary, and the device ID consists of a combination of a manufacturer name, a model name, and a serial number.

The user terminal 50 is a terminal device of the customer at the base a or b, and requests the report production apparatus 100 to produce a report on a browser displayed on a display device that is not shown. The user terminal 50 acquires the report produced by the report production apparatus 100 and displays the acquired report on the browser.

Figure 2:
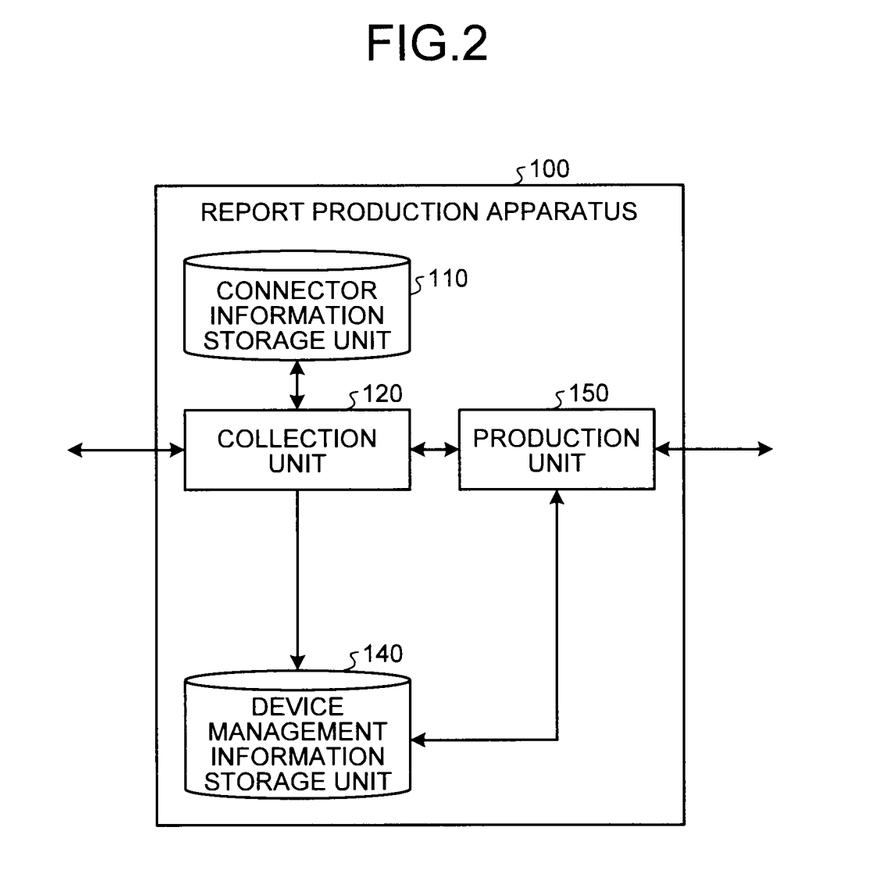
FIG. 2 is a block diagram showing an example of a configuration of a report production apparatus of the present embodiment.

The report production apparatus 100 is a server device for producing a report of the image forming device disposed at the base a or b according to a request from the user terminal 50. FIG. 2 is a block diagram showing an example of a configuration of the report production apparatus 100 of the present embodiment. As shown in FIG. 2, the report production apparatus 100 includes a connector information storage unit 110, a collection unit 120, a device management information storage unit 140, and a production unit 150.

The connector information storage unit 110 and the device management information storage unit 140 may be realized by, for example, at least one of existing storage devices capable of magnetic, optical, or electrical storage, such as an hard disk drive (HDD), a solid state drive (SSD), a memory card, an optical disc, read only memory (ROM), and random access memory (RAM). The collection unit 120 and the production unit 150 may be realized by, for example, an existing control device such as a central processing unit (CPU).

The connector information storage unit 110 stores information of a connector generated by the collection unit 120, which will be described later. For example, the connector information storage unit 110 stores a table in which a base ID for identifying a base of a customer is associated with a connector name of a connector, which corresponds to a data source of a database system (the device management system and the service desk system) introduced at the base of the customer. Further, the connector will be described in detail later.

The collection unit 120 (an example of a first collection unit, a second collection unit, and a third collection unit) collects the device management information from the device management systems 20a and 20b, the contract information from the contract system 30, and the service information from the service desk systems 40a and 40b.

Specifically, when the collection unit 120 collects the device management information from the device management systems 20a and 20b, the collection unit 120 makes an acquisition request to the respective device management systems 20a and 20b depending on types of the device management systems, and collects pieces of device management information from the respective device management systems 20a and 20b. The collection unit 120 converts the collected pieces of device management information into a common format for device management information, and stores the pieces of device management information in the device management information storage unit 140.

For example, the collection unit 120 transmits queries to the respective device management systems 20a and 20b depending on types of databases, and collects pieces of device management information from the device management systems 20a and 20b. The collection unit 120 maps the collected pieces of device management information to a common object for device management information to thereby convert the pieces of device management information into the common format for device management information, and stores the pieces of device management information in the device management information storage unit 140.

When there are no responses to the acquisition requests (queries) to the device management systems 20a and 20b, that is, the collection unit 120 fails to communicate with the device management systems 20a and 20b, the collection unit 120 does not collect the device management information.

Figure 3:
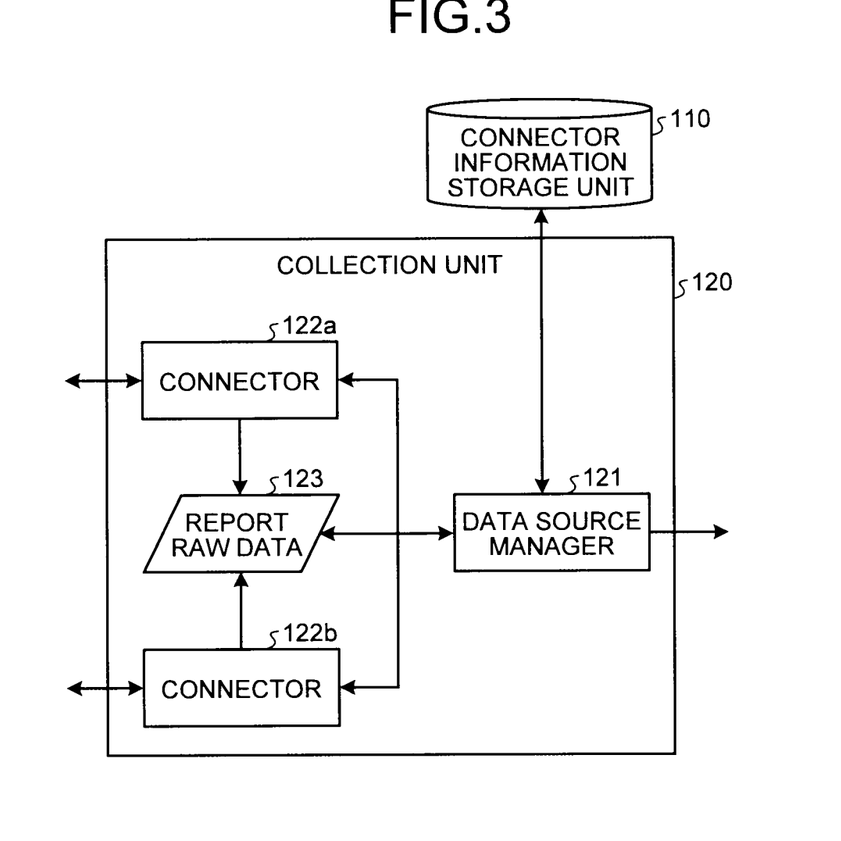
FIG. 3 is a block diagram showing an example of a detailed configuration in which a collection unit of the present embodiment collects pieces of device management information.

FIG. 3 is a block diagram showing an example of a detailed configuration in which the collection unit 120 of the present embodiment collects the pieces of device management information. As shown in FIG. 3, the collection unit 120 includes a data source manager 121 and connectors 122a and 122b.

The data source manager 121 acquires a connector name associated with a base ID indicating a base of a collection target from the connector information storage unit 110 at timing for device management information collection, and generates a connector corresponding to the acquired connector name through reflection. In the present embodiment, the data source manager 121 creates the connector 122a from a connector name associated with the base ID of the base a and creates the connector 122b from the connector name associated with the base ID of the base b. Further, the connector 122a corresponds to a data source of the device management system 20a of the base a and the connector 122b corresponds to a data source of the device management system 20b of the base b. The data source manager 121 stores report raw data 123 created by the connectors 122a and 122b in the device management information storage unit 140.

The connectors 122a and 122b generate and transmit queries to request the data sources of the device management systems 20a and 20b to acquire pieces of device management information as queries depending on the types of the data sources or table definition. Each of the connectors 122a and 122b acquires a device ID (a combination of a manufacturer name, a model name, and a serial number) and an output count as the device management information. Here, the report raw data 123 will be described. The report raw data 123 is a common object created by the connectors 122a and 122b, and includes, in its own fields, information such as a manufacturer name (Manufacture), a model name (Model), a serial number (Serial Number), and an output count (Counter). Each of the connectors 122a and 122b creates an instance of the report raw data 123 from the acquired device ID and output count, and maps the created instance to a list of the report raw data 123 according to the fields. Thereby, the report raw data 123 is creates.

Returning to FIG. 2, when the collection unit 120 collects the contract information from the contract system 30, the collection unit 120 makes an acquisition request to the contract system 30 and collects the contract information. For example, the collection unit 120 transmits a query to the contract system 30 depending on a type of a database, and collects the contract information from the contract system 30.

Further, when there is no response to the acquisition request (query) to the contract system 30, that is, when the collection unit 120 fails to communicate with the contract system 30, the collection unit 120 does not collect the contract information. Further, even when an error is returned in response to the acquisition request (query) to the contract system 30, that is, when the contract information is not managed in the contract system 30, the collection unit 120 does not collect the contract information.

Further, when the collection unit 120 collects the pieces of service information from the service desk systems 40a and 40b, the collection unit 120 makes an acquisition request to the respective service desk systems 40a and 40b depending on types of the service desk systems and collects the pieces of service information from the respective service desk systems 40a and 40b. The collection unit 120 converts the collected pieces of service information into a common format for service information.

For example, the collection unit 120 transmits a query to the service desk systems 40a and 40b depending on types of databases, and collects pieces of service information from the service desk systems 40a and 40b. The collection unit 120 maps the collected pieces of service information to a common object for service information to thereby convert the pieces of service information into a common format for service information.

When there is no response to the acquisition request (query) to the service desk systems 40a and 40b, that is, when the collection unit 120 fails to communicate with the service desk systems 40a and 40b, the collection unit 120 does not collect the service information.

Figure 4:
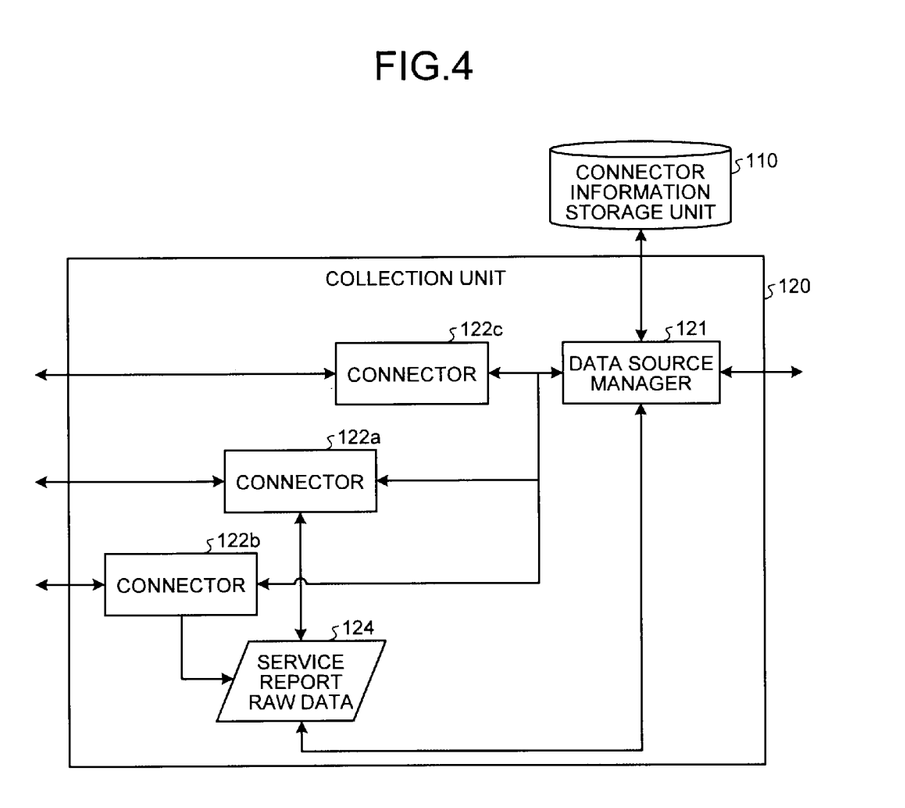
FIG. 4 is a block diagram showing an example of a detailed configuration in which the collection unit of the present embodiment collects contract information and service information.

FIG. 4 is a block diagram showing an example of a detailed configuration in which the collection unit 120 of the present embodiment collects the pieces of contract information and the pieces of service information. As shown in FIG. 4, the collection unit 120 includes the data source manager 121, and connectors 122a, 122b, and 122c.

When collection of the contract information and the service information is requested from the production unit 150, which will be described later, the data source manager 121 acquires a connector name associated with a base ID indicating a base of a collection target from the connector information storage unit 110, creates a connector corresponding to the acquired connector name through reflection. In the present embodiment, the data source manager 121 creates the connector 122a from a connector name associated with the base ID of the base a and creates the connector 122b from the connector name associated with the base ID of the base b. Further, the connector 122a corresponds to the data source of the device management system 20a at the base a, and the connector 122b corresponds to the data source of the device management system 20b at the base b. Further, in the present embodiment, the connector 122c corresponding to the data source of the contract system 30 is assumed to have been created in advance since there is one type of the contract system 30, but the connector 122c may be created by the same procedure as the connectors 122a and 122b. The data source manager 121 delivers the contract information collected by the connector 122c and service report raw data 124 created by the connectors 122a and 122b to the production unit 150, which will be described later.

The connector 122c creates a query to request acquisition of the contract information as a query depending on a type of the data source or a table definition and transmits the query to the data source of the contract system 30. The connector 122c acquires, as the contract information, an upper limit of a device abnormality count in a given period of a device abnormality type of each of the devices disposed at the bases a and b, and delivers the contract information to the data source manager 121.

The connectors 122a and 122b create queries to request the data sources of the service desk systems 40a and 40b to acquire the pieces of service information, as queries depending on the types of the data sources or table definition, transmit the queries, and acquire device IDs (serial numbers) and device abnormality counts as the service information. Here, the service report raw data 124 will be described. The service report raw data 124 is a common object created by the connectors 122a and 122b, and includes, in its own fields, information such as a serial number (Serial Number), and a device abnormality count (Incident) for each device abnormality type. Each of the connectors 122a and 122b creates an instance of the service report raw data 124 from the acquired device ID (serial number) and the device abnormality count, and maps the created instance to a list of the service report raw data 124 according to the fields. Thereby, the service report raw data 124 is created.

Returning to FIG. 2, the pieces of device management information collected by the collection unit 120 and converted into the common format for device management information are stored in the device management information storage unit 140. Specifically, the device management information storage unit 140 stores the report raw data 123 created by the collection unit 120.

When report production is requested from the user terminal 50, the production unit 150 requests the collection unit 120 to collect the contract information and the service information, and acquires the contract information and the pieces of service information with the common format for service information from the collection unit 120. Further, the production unit 150 acquires the pieces of device management information with the common format for device management information from the device management information storage unit 140. The production unit 150 produces a report using the pieces of device management information with the common format for device management information, the contract information, and the pieces of service information with the common format for service information, and outputs the report to the user terminal 50.

Specifically, the production unit 150 produces a report for each device indicating a usage and whether the count of device abnormalities is in a range of a quality assurance. However, when the collection unit 120 fails to collect the contract information or when the collection unit 120 fails to collect the service information, the production unit 150 produces a report indicating a usage of each device. Further, the production unit 150 produces a report indicating whether the count of device abnormalities for each device is in the quality assurance range when the collection unit 120 fails to correct the device management information.

Figure 5:
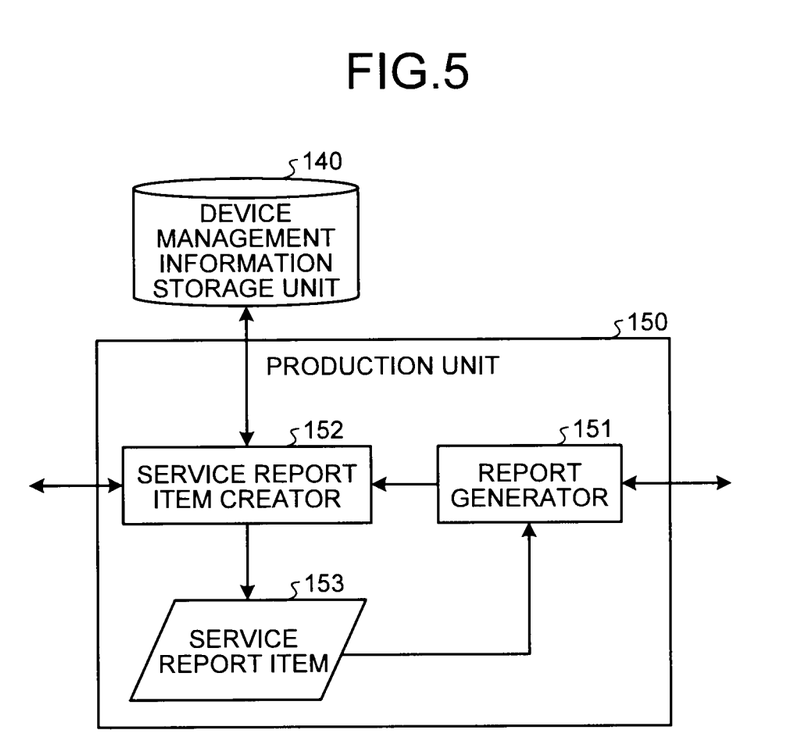
FIG. 5 is a block diagram showing an example of a detailed configuration of a production unit of the present embodiment.

FIG. 5 is a block diagram showing an example of a detailed configuration of the production unit 150 of the present embodiment. As shown in FIG. 5, the production unit 150 includes a report generator 151 and a service report item creator 152.

The report generator 151 receives a report production request from the user terminal 50, and instructs the service report item creator 152 to create a service report item 153 necessary for report production and acquire the contract information. The report generator 151 produces a report from the service report item 153 created by the service report item creator 152 and the contract information, and outputs the report to the user terminal 50. For example, the report generator 151 compares the service information of the service report item 153 with the contract information, and produces a report reflecting the combination result (whether the service information satisfies the contract information or not).

Generation of the service report item 153 and acquisition of the contract information are instructed by the report generator 151 to the service report item creator 152. In this case, the service report item creator 152 acquires the report raw data 123 from the device management information storage unit 140, and requests the collection unit 120 to collect the contract information and the service information to acquire the contract information and the service report raw data 124. The service report item creator 152 associates the report raw data 123 with the service report raw data 124 using the serial number as a key to create the service report item 153. The service report item 153 is a data object, and includes, in its own fields, information such as a manufacturer name (Manufacture), a model name (Model), a serial number (Serial Number), a device abnormality count (Incident), and an output count (Counter). The service report item creator 152 delivers the generated service report item 153 and the acquired contract information to the report generator 151.

Figure 6:
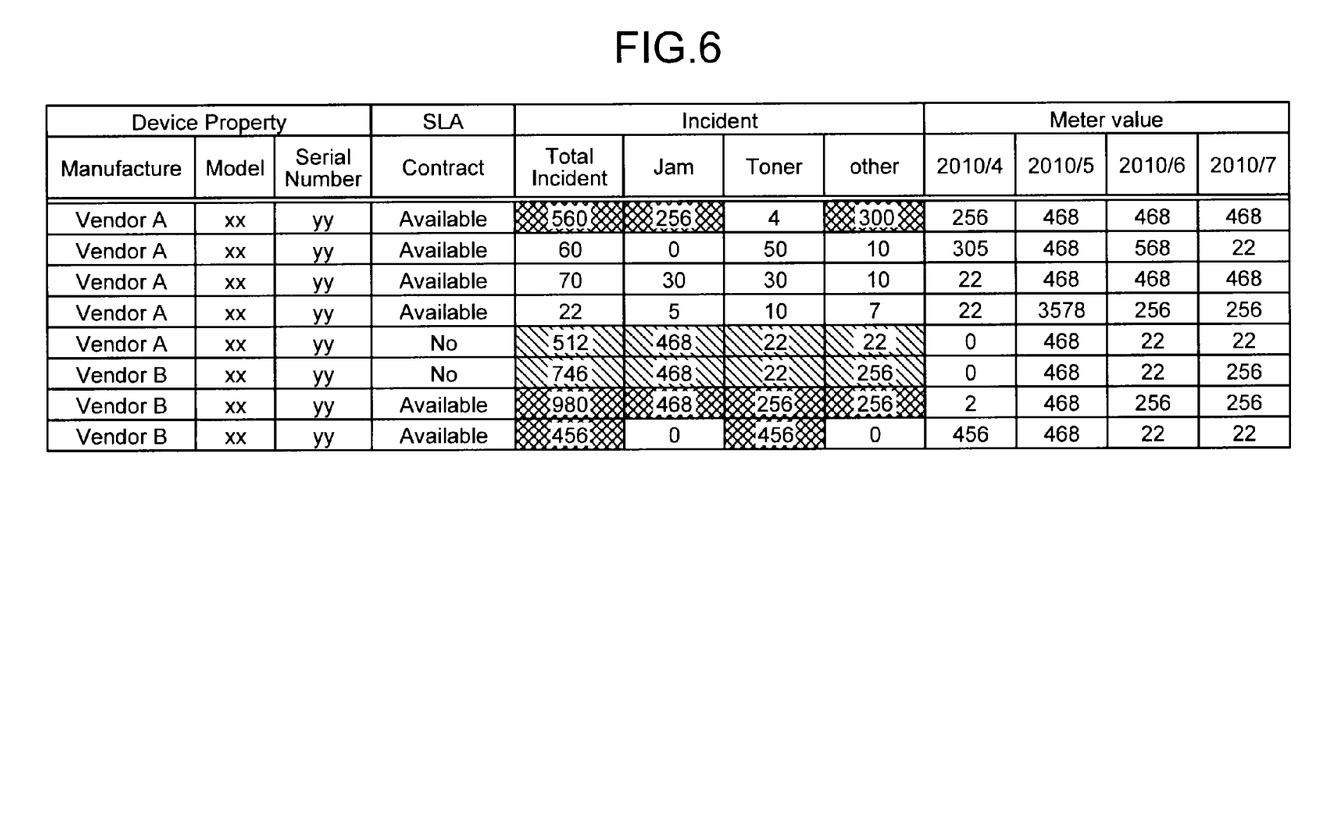
FIG. 6 is a diagram showing an example of a service meter report produced by the production unit of the present embodiment.

FIG. 6 is a diagram showing an example of a service meter report produced by the production unit 150 of the present embodiment. The service meter report shown in FIG. 6 is a report produced by the production unit 150 when the collection unit 120 is able to collect the pieces of device management information, the contract information, and the pieces of service information.

As shown in FIG. 6, the service meter report is a report from which, for each property of each device (Device Property), presence or absence of contract information (SLA), a device abnormality count (Incident) for each device abnormality type, and a meter value that is a monthly output count (Meter value) can be confirmed. Further, the device abnormality type includes total (Total Incident), jam occurrence (Jam), out of toner (Toner), and other (Other). For devices for which an upper limit of a device abnormality count for each device abnormality type has been defined in the SLA contract (devices for which the SLA Contract is Available), the device abnormality count exceeding the upper limit is indicated by cross-hatching. Further, for devices for which the upper limit of the device abnormality count for each device abnormality type has not been defined in the SLA contract (a device for which there is No SLA Contract), the device abnormality count is indicated by downward-sloping diagonal hatching.

Figure 7:
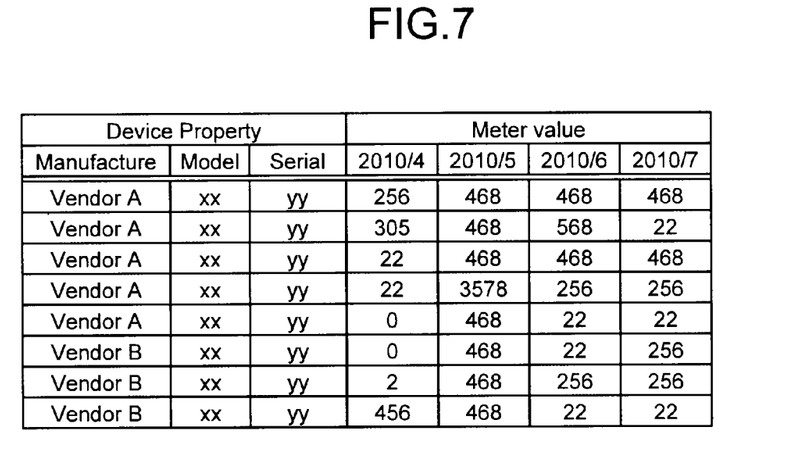
FIG. 7 is a diagram showing an example of a Meter report produced by the production unit of the present embodiment.

FIG. 7 is a diagram showing an example of a Meter report produced by the production unit 150 of the present embodiment. The meter report shown in FIG. 7 is a report produced by the production unit 150 when the collection unit 120 fails to collect the contract information or the service information. As shown in FIG. 7, the meter report is a report from which a meter value (Meter value) that is a monthly output count can be confirmed for each property of each device (Device Property).

Figure 8:
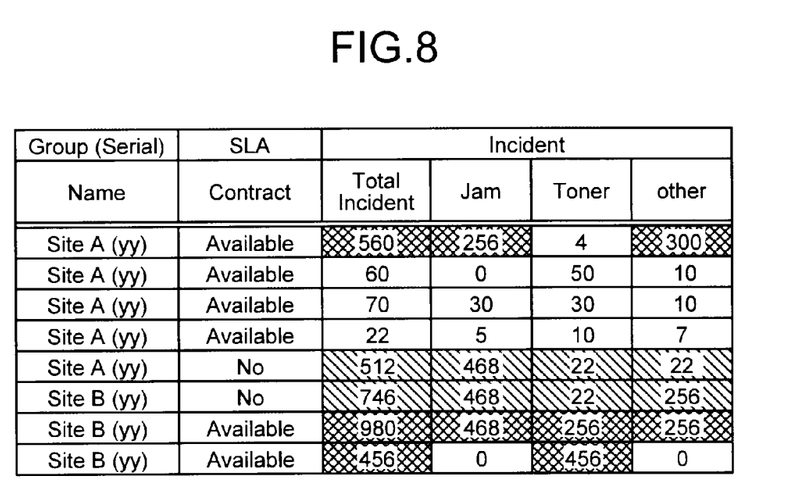
FIG. 8 is a diagram showing an example of a service report produced by the production unit of the present embodiment.

FIG. 8 is a diagram showing an example of a service report produced by the production unit 150 of the present embodiment. Further, the service report shown in FIG. 8 is a report produced by the production unit 150 when the collection unit 120 fails to collect the device management information.

As shown in FIG. 8, the service report is a report from which presence or absence of contract information (SLA) and a device abnormality count (Incident) for each device abnormality type can be confirmed for each device at each base (Group (Serial)). Further, the device abnormality type includes total (Total Incident), jam occurrence (Jam), out of toner (Toner), and other (Other). For devices for which an upper limit of the device abnormality count for each device abnormality type has been defined in the SLA contract (devices for which the SLA Contract is Available), the device abnormality count exceeding the upper limit is indicated by cross-hatching. Further, for devices for which the upper limit of the device abnormality count for each device abnormality type has not been defined in the SLA contract (devices for which there is No SLA Contract), the device abnormality count is indicated by a downward-sloping diagonal hatching.

Next, operation of the report production system of the present embodiment will be described.

Figure 9:
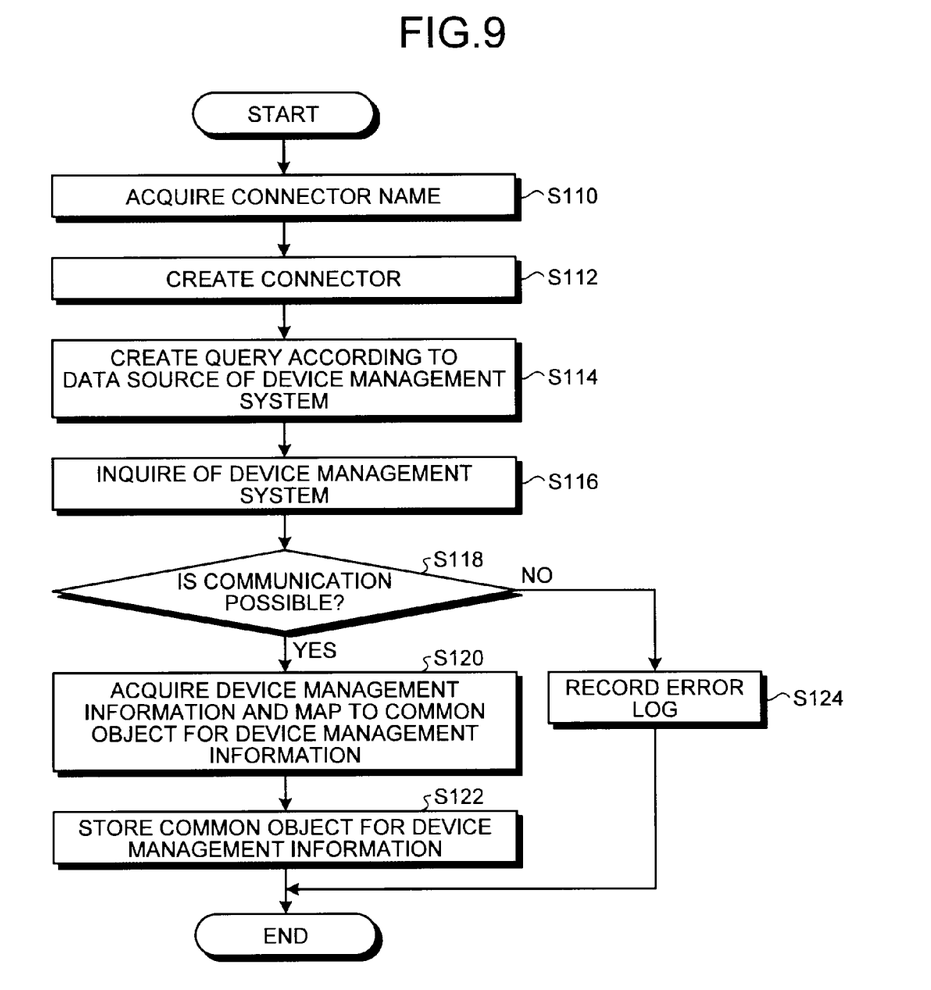
FIG. 9 is a flowchart showing an example of a device management information correction process performed in a report production system of the present embodiment.

FIG. 9 is a flowchart showing an example of a device management information correction process performed in the report production system 10 of the present embodiment.

First, the data source manager 121 acquires a connector name associated with a base ID indicating a base of a collection target from the connector information storage unit 110 at timing of device management information collection (step S110).

The data source manager 121 then creates a connector corresponding to the acquired connector name through reflection (step S112). In the present embodiment, the data source manager 121 creates the connector 122a from a connector name associated with the base ID of the base a, and creates the connector 122b from the connector name associated with the base ID of the base b.

The connectors 122a and 122b then create a query to request the data sources of the device management systems 20a and 20b to acquire the device management information, depending on types of data sources or table definition, respectively (step S114).

The connectors 122a and 122b then transmit the created queries to the device management systems 20a and 20b to perform acquisition inquiry for the device management information, respectively (step S116).

Subsequently, when the connectors 122a and 122b can communicate with the device management systems 20a and 20b, respectively (Yes in step S118), the connectors 122a and 122b acquire the pieces of device management information from the device management systems 20a and 20b and map the pieces of device management information to the common object for device management information (report raw data 123) (step S120).

The data source manager 121 then stores the common objects for device management information to which the device management information has been mapped in the device management information storage unit 140 (step S122).

When the connectors 122a and 122b fail to communicate with the device management systems 20a and 20b, respectively (No in step S118), the connectors 122a and 122b record an error log (step S124).

Figure 10:
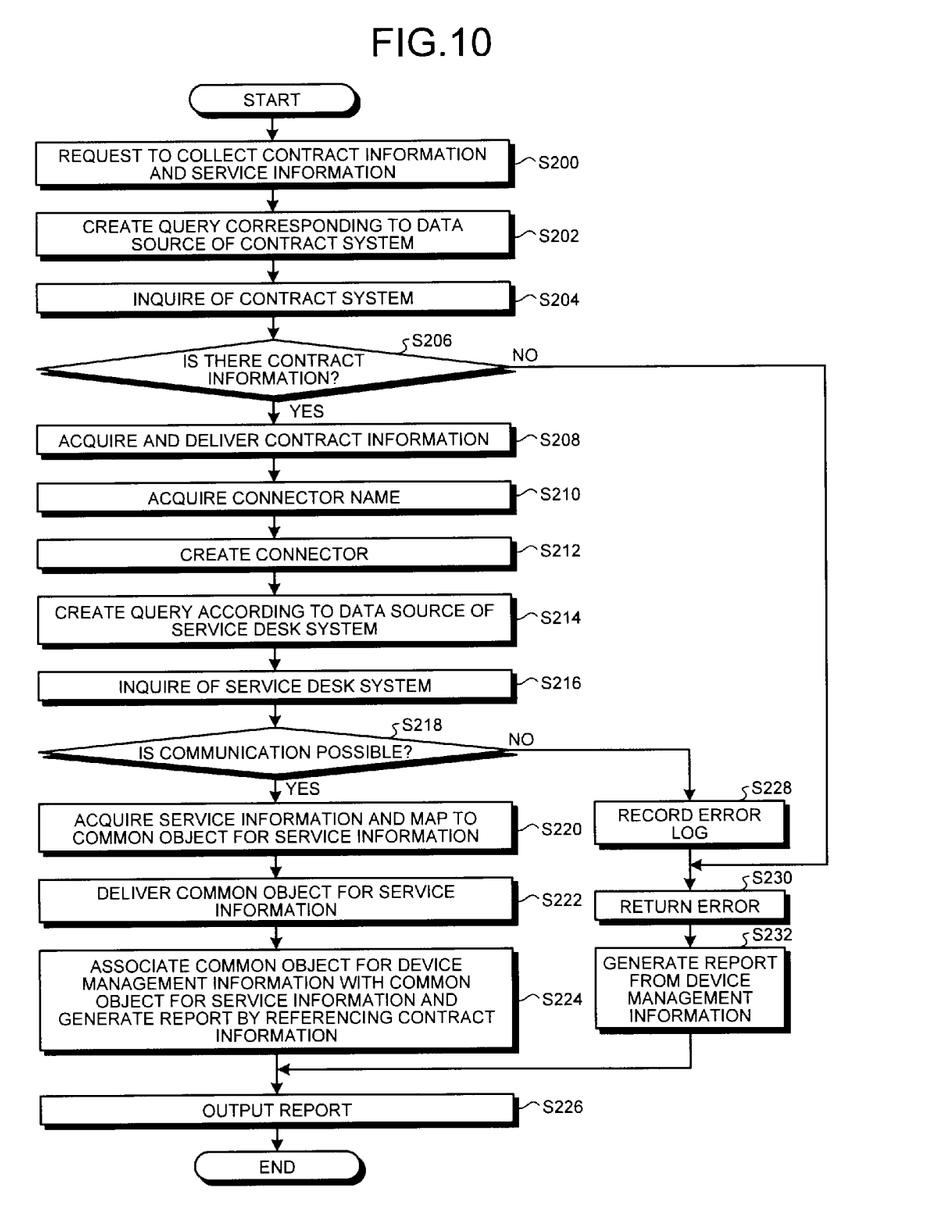
FIG. 10 is a flowchart showing an example of a report production process performed in the report production system of the present embodiment.

FIG. 10 is a flowchart showing an example of a report production process performed in the report production system 10 of the present embodiment.

First, when the report generator 151 receives a report production request from the user terminal 50, the service report item creator 152 requests the collection unit 120 to collect the contract information and the service information (step S200).

Subsequently, the connector 122c creates a query to request the data source of the contract system 30 to acquire the contract information, depending on a type of the data source or table definition (step S202).

The connector 122c then transmits the created query to the contract system 30 to perform acquisition inquiry for the contract information (step S204).

Subsequently, when there is contract information in the contract system 30 (Yes in step S206), the connector 122c acquires the contract information from the contract system 30, and delivers the contract information to the production unit 150 via the data source manager 121 (step S208). Further, when there is no contract information in the contract system 30 or when the connector 122c fails to communicate with the contract system 30 (No in step S206), the process proceeds to step S230.

The data source manager 121 then acquires a connector name associated with a base ID indicating a base of a collection target of the service information from the connector information storage unit 110 (step S210).

The data source manager 121 then creates a connector corresponding to the acquired connector name through reflection (step S212). In the present embodiment, the data source manager 121 creates the connector 122a from a connector name associated with the base ID of the base a, and creates the connector 122b from the connector name associated with the base ID of the base b.

The connectors 122a and 122b then create queries to request the data sources of the service desk systems 40a and 40b to acquire the pieces of service information, depending on the types of the data sources or table definition, respectively (step S214).

The connectors 122a and 122b then transmit the created queries to the service desk systems 40a and 40b to perform acquisition inquiry for the service information, respectively (step S216).

Subsequently, when the connectors 122a and 122b can communicate with the service desk systems 40a and 40b, respectively (Yes in step S218), the connectors 122a and 122b acquire the pieces of service information from the service desk systems 40a and 40b, and map the pieces of service information to the common object for service information (service report raw data 124) (step S220).

The data source manager 121 then delivers the common objects for service information to which the service information has been mapped, to the production unit 150 (step S222).

The service report item creator 152 then acquires the common object for device management information from the device management information storage unit 140, and creates a data object associated with a common object for service information. The report generator 151 generates (produces) a report from the data object by referencing the contract information (step S224).

The report generator 151 then outputs the generated report to the user terminal 50 (step S226).

When the connectors 122a and 122b fail to communicate with the service desk systems 40a and 40b, respectively (No in step S218), the connectors 122a and 122b record an error log (step S228).

The data source manager 121 then returns an error to the production unit 150 (step S230).

The service report item creator 152 then acquires the common object for device management information from the device management information storage unit 140 and creates a data object. The report generator 151 generates (produces) a report from the data object by referencing the contract information. That is, the report generator 151 generates (produces) a report from the device management information (the common object for device management information) (step S232).

As described above, in the present embodiment, the connectors corresponding to data sources of multiple types of device management systems (databases) for managing the pieces of device management information of the devices disposed at their own bases are created, and each connector acquires the pieces of device management information from the corresponding device management system. Thereby, even when there are multiple types of device management systems together, device management information can be acquired from all the device management systems. Further, in the present embodiment, the acquired multiple types of device management information can be converted into the common format for device management information by mapping the device management information to the common object for device management information.

Similarly, in the present embodiment, connectors corresponding to data sources of multiple types of service desk systems (databases) for managing the pieces of service information of the devices disposed at their own bases are generated, and each connector acquires the service information from the corresponding service desk system. Thereby, even when there are multiple types of service desk systems together, the service information can be acquired from all the service desk systems. Further, in the present embodiment, the acquired multiple types of service information can be converted into the common format for service information by mapping the pieces of service information to the common object for service information.

Thereby, according to the present embodiment, it is possible to produce a report of devices disposed over a plurality of bases.

In particular, in the present embodiment, as the common object for device management information and the common object for service information with the common format are associated, multiple types of device management information and service information can be associated. Since the report is produced using the service information as well as the device management information, it is possible to produce a report more suitable for user needs.

Hardware Configuration

An example of a hardware configuration of the report production apparatus 100 of the present embodiment will be described. The report production apparatus 100 of the present embodiment includes a control device such as a CPU, a storage device such as ROM or RAM, an external storage device such as an HDD, a display device such as a display, an input device such as a keyboard or a mouse, and a communication device such as a communication interface, and has a hardware configuration using a typical computer.

A report production program executed by the report production apparatus 100 of the present embodiment is an installable or executable file and is stored and provided in a computer-readable recording medium, such as a CD-ROM, a CD-R, a memory card, a DVD (Digital Versatile Disk), or a flexible disk (FD).

Further, the report production program executed by the report production apparatus 100 of the present embodiment may be stored on a computer connected to a network such as the Internet, and provided through downloading via the network. Further, the report production program executed by the report production apparatus 100 of the present embodiment may be provided or distributed via a network such as the Internet. Alternatively, the report production program executed by the report production apparatus 100 of the present embodiment may be incorporated in, for example, ROM and provided.

The report production program executed by the report production apparatus 100 of the present embodiment has a module configuration for realizing the above-described units on a computer. As an actual hardware, the CPU reads and executes the report production program from the HDD to the RAM such that the respective units are realized on the computer.

Further, the present invention is not limited to the above-described embodiment and various variations can be made to the present invention.

Modification

For example, the image forming device has been described by way of example in the embodiment, but the present invention is not limited thereto and any electronic device may be used.

According to the embodiments, it is possible to produce a report for devices disposed over a plurality of bases.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A computer-implemented method for generating a report, using one or more device management systems, a contract information system, and one or more service desk systems, the computer-implemented method comprising:
   collecting, from the one or more device management systems, device management information managed in a first data structure associated with a type of each of the one or more device management systems;
   converting, based on the type of each of the one or more device management systems, the first data structure into a first common data structure for device management information for each portion of the collected device management information;
   collecting, from the one or more service desk systems, service information about device condition managed in a second data structure associated with a type of each of the one or more service desk systems;
   converting, based on the type of each of the one or more service desk systems, the second data structure into a second common data structure for service information for each portion of the collected service information;
   collecting, from the contract information system, contract information corresponding to service which is applied to one or more devices corresponding to each of the one or more device management systems;
   generating report data representing whether trouble of each said device is within a range of guarantee of a contract or not based on the collected contract information, the device management information in the first common data structure for device management information, and the service information in the second common data structure for service information; and
   outputting the generated report data.

2. The computer-implemented method of claim 1, wherein the device management information includes device identification information and usage information of each said device.

3. The computer-implemented method of claim 2, wherein the device management information further includes one of a number of each trouble of the device, an arrival time of a service person, a performance rate of the device, and time of restoration time of the device.

4. The computer-implemented method of claim 1, wherein the contract information includes one of an upper limit time of arrival of a service person, a lowest performance rate within a predetermined period, and an upper limit time until recovery of the device.

5. The computer-implemented method of claim 1, wherein said converting the first data structure based on the type of each of the one or more device management systems includes mapping the device management information to a common object for each said portion of the collected device management information.

6. The computer-implemented method of claim 1, wherein said converting the second data structure based on the type of each of the one or more service desk systems includes mapping the service information to a common object for each said portion of the collected service information.

7. A report generating apparatus, in communication with device management systems, a contract information system, and service desk systems via a network, the report generating apparatus comprising a processor, in communication with memory, that is configured to:

collect, from the device management systems, device management information managed in a first data structure associated with a type of each of the device management systems;

convert, based on the type of each of the device management systems, the first data structure into a first common data structure for device management information for each portion of the collected device management information;

collect, from the service desk systems, service information about device condition managed in a second data structure associated with a type of each of the service desk systems;

convert, based on the type of each of the service desk systems, the second data structure into a second common data structure for service information for each portion of the collected service information;

collect, from the contract information system, contract information corresponding to service which is applied to one or more devices corresponding to each of the device management systems;

generate report data representing whether trouble of each said device is within a range of guarantee of a contract or not based on the collected contract information, the device management information in the first common data structure for device management information, and the service information in the second common data structure for service information; and output the generated report data.

8. The computer-implemented method of claim 1, wherein said generating the report data is performed to selectively produce one of a plurality of different reports based on whether and which of one or more of the device management information, the service information, and the contract information is collected.

9. The report generating apparatus of claim 7, wherein the report generating apparatus generates the report data to selectively produce one of a plurality of different reports based on whether and which of one or more of the device management information, the service information, and the contract information is collected.

10. The computer-implemented method of claim 1, further comprising displaying the outputted report data on a browser displayed on a display device of a remote terminal computer.

11. The computer-implemented method of claim 1, wherein the one or more device management systems include at least two device management systems of different type, having respective first data structures of different type.

12. The computer-implemented method of claim 1, wherein the one or more service desk systems include at least two service desk systems of different type, having respective second data structures of different type.

13. The computer-implemented method of claim 1, wherein the computer-implemented method is implemented at least partially in a computer of a report production apparatus.

14. The report generating apparatus of claim 7, wherein the processor is configured to cause display of the outputted report data on a browser displayed on a display device of a remote terminal computer.

* * * * *